United States Patent
Weaver

(10) Patent No.: US 8,783,088 B2
(45) Date of Patent: Jul. 22, 2014

(54) APPARATUS AND METHOD FOR DETERMINING DISPLACER POSITION IN A FLOWMETER PROVER

(75) Inventor: Drew S. Weaver, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 294 days.

(21) Appl. No.: 13/278,416

(22) Filed: Oct. 21, 2011

(65) Prior Publication Data

US 2012/0186323 A1    Jul. 26, 2012

Related U.S. Application Data

(60) Provisional application No. 61/435,173, filed on Jan. 21, 2011.

(51) Int. Cl.
*G01F 25/00* (2006.01)

(52) U.S. Cl.
CPC ................... *G01F 25/0015* (2013.01)
USPC ............................................. 73/1.22; 73/1.23

(58) Field of Classification Search
USPC ........................ 73/1.19, 1.21–1.23; 702/100
See application file for complete search history.

(56) References Cited

U.S. PATENT DOCUMENTS

| | | | |
|---|---|---|---|
| 3,120,118 A * | 2/1964 | Boyle | 73/1.23 |
| 3,403,544 A * | 10/1968 | Francisco, Jr. | 73/1.21 |
| 4,606,218 A | 8/1986 | Chisman, III | |
| 4,619,134 A | 10/1986 | Bohm et al. | |
| 4,905,844 A | 3/1990 | Custer et al. | |
| 6,629,447 B1 | 10/2003 | Collins | |
| 7,168,329 B2 | 1/2007 | Bell et al. | |
| 7,395,690 B2 * | 7/2008 | Cotton | 73/1.19 |
| 7,716,963 B2 * | 5/2010 | Bell et al. | 73/1.34 |
| 7,925,456 B2 * | 4/2011 | McAnally et al. | 702/45 |
| 8,161,791 B2 * | 4/2012 | Ignatian | 73/1.19 |
| 8,239,157 B2 * | 8/2012 | McAnally et al. | 702/100 |
| 2007/0169536 A1 | 7/2007 | Cotton | |
| 2007/0169537 A1 * | 7/2007 | Cotton | 73/1.27 |
| 2008/0189054 A1 * | 8/2008 | McAnally et al. | 702/45 |
| 2011/0036178 A1 | 2/2011 | Day | |
| 2011/0144938 A1 * | 6/2011 | McAnally et al. | 702/100 |

FOREIGN PATENT DOCUMENTS

| | | | | |
|---|---|---|---|---|
| CN | 1739005 A | | 2/2006 | |
| GB | 2129569 A | * | 5/1984 | G01F 25/00 |

OTHER PUBLICATIONS

International Application No. PCT/US2012/021160 Search Report and Written Opinion dated Aug. 7, 2012.
First Office Action dated Dec. 10, 2013 for Chinese Patent Application No. 201210019984.9.

* cited by examiner

*Primary Examiner* — Hezron E Williams
*Assistant Examiner* — Nathaniel Kolb
(74) *Attorney, Agent, or Firm* — Conley Rose, P.C.

(57) ABSTRACT

Apparatus and methods for proving a flowmeter. In one embodiment, a flowmeter prover includes a flow tube, a displacer, and a signal analyzer. The displacer is moveable in a flow passage of the flow tube. A magnetic target is disposed on the displacer. One or more inductive transducers are disposed on the flow tube and configured to detect the magnetic target as the displacer moves in the flow tube. The signal analyzer is configured to detect a maximum slope of rising and falling edges of a signal generated by the transducer responsive to the magnetic target traversing the transducer. The signal analyzer is further configured to determine displacer velocity based on the detected maximum slope.

28 Claims, 6 Drawing Sheets

APPARATUS AND METHOD FOR DETERMINING DISPLACER POSITION IN A FLOWMETER PROVER

CROSS-REFERENCE TO RELATED APPLICATION

The present application claims priority to U.S. Provisional Patent Application No. 61/435,173, filed on Jan. 21, 2011; which is hereby incorporated herein by reference.

BACKGROUND

After hydrocarbons have been removed from the ground, the fluid stream (such as crude oil or natural gas) is transported from place to place via pipelines. It is desirable to know with accuracy the amount of fluid flowing in the stream, and particular accuracy is demanded when the fluid is changing hands, or "custody transfer." Custody transfer can occur at a fluid fiscal transfer measurement station or skid, which may include key transfer components such as a measurement device or flowmeter, a proving device, associated pipes and valves, and electrical controls. Measurement of the fluid stream flowing through the overall delivery pipeline system starts with the flowmeter, which may include, for example, a turbine meter, a positive displacement meter, an ultrasonic meter, a coriolis meter, or a vortex meter.

Flow characteristics of the fluid stream can change during product delivery, thereby affecting accurate measurement of the product being delivered. Typically, changes of pressure, temperature and flow rate are acknowledged by operator intervention. These changes are represented as changes in the flow characteristics, and are normally verified by the operator via the effects of the changes and their effect on the measurement device. Flow meter performance can be affected by characteristics of the fluid and/or by the arrangement of piping components. Normally, verification of flow meter performance is conducted by proving the flowmeter with a proving device, or prover. A calibrated prover, adjacent the measurement device on the skid and in fluid communication with the measurement device, samples volumes of the fluid and the sampled volumes are compared to the throughput volumes of the measurement device. If there are statistically important differences between the compared volumes, the throughput volume of the measurement device is adjusted to reflect the actual flowing volume as identified by the prover.

The prover has a precisely known volume which is calibrated to known and accepted standards of accuracy, such as those prescribed by the American Petroleum Institute (API) or the International Standards Organization (ISO). The precisely known volume of the prover can be defined as the volume of product between two detector switches that is displaced by the passage of a displacer, such as an elastomeric sphere or a piston. The known volume that is displaced in the prover is compared to the throughput volume of the flowmeter. If the comparison yields a volumetric differential of zero or an acceptable variation therefrom, the flowmeter is then considered to be accurate within the limits of allowed tolerances. If the volumetric differential exceeds the limits allowed, then evidence is provided indicating that the flowmeter may not be accurate. Thereafter, the flowmeter throughput volume can be adjusted to reflect the actual flowing volume as identified by the prover. The adjustment may be made with a flowmeter correction factor. In order to obtain precise calibration, the displacer position in the prover must be accurately determined with dynamic flow of the fluid through the prover. The prover is the in-field reference standard against which the meter is calibrated.

SUMMARY

Apparatus and methods for proving a flowmeter. In one embodiment, a flowmeter prover includes a flow tube, a displacer, and a signal analyzer. The displacer is moveable in a flow passage of the flow tube. A magnetic target is disposed on the displacer. One or more inductive transducers are disposed on the flow tube and configured to detect the magnetic target as the displacer moves in the flow tube. The signal analyzer is configured to detect a signal indicative of change of inductance of each transducer caused by the magnetic target moving across the transducer. The signal analyzer is further configured to determine displacer velocity based on edges of the signal.

In another embodiment, a method for proving a flowmeter includes inducing movement of a displacer in a flow tube of a prover by fluid flow. Inductance of an inductive transducer coupled to the flow tube changes based on proximity of a magnet target of the displacer to the transducer. A signal indicative of change of the inductance is detected. Displacer velocity is determined based on edges of the signal.

In a further embodiment, a flow metering system includes a flowmeter prover. The flowmeter prover includes a displacer disposed in a flow tube. The flow tube includes a plurality of inductive transducers disposed along the length of the flow tube. The flowmeter prover also includes a pulse generation circuit coupled to each transducer. The pulse generation circuit is configured to generate a pulse having slope corresponding to a rate of change of inductance of the transducer produced by the displacer moving across the transducer.

BRIEF DESCRIPTION OF THE DRAWINGS

For a detailed description of exemplary embodiments, reference will now be made to the accompanying drawings in which.

NOTATION AND NOMENCLATURE

Figure 1:
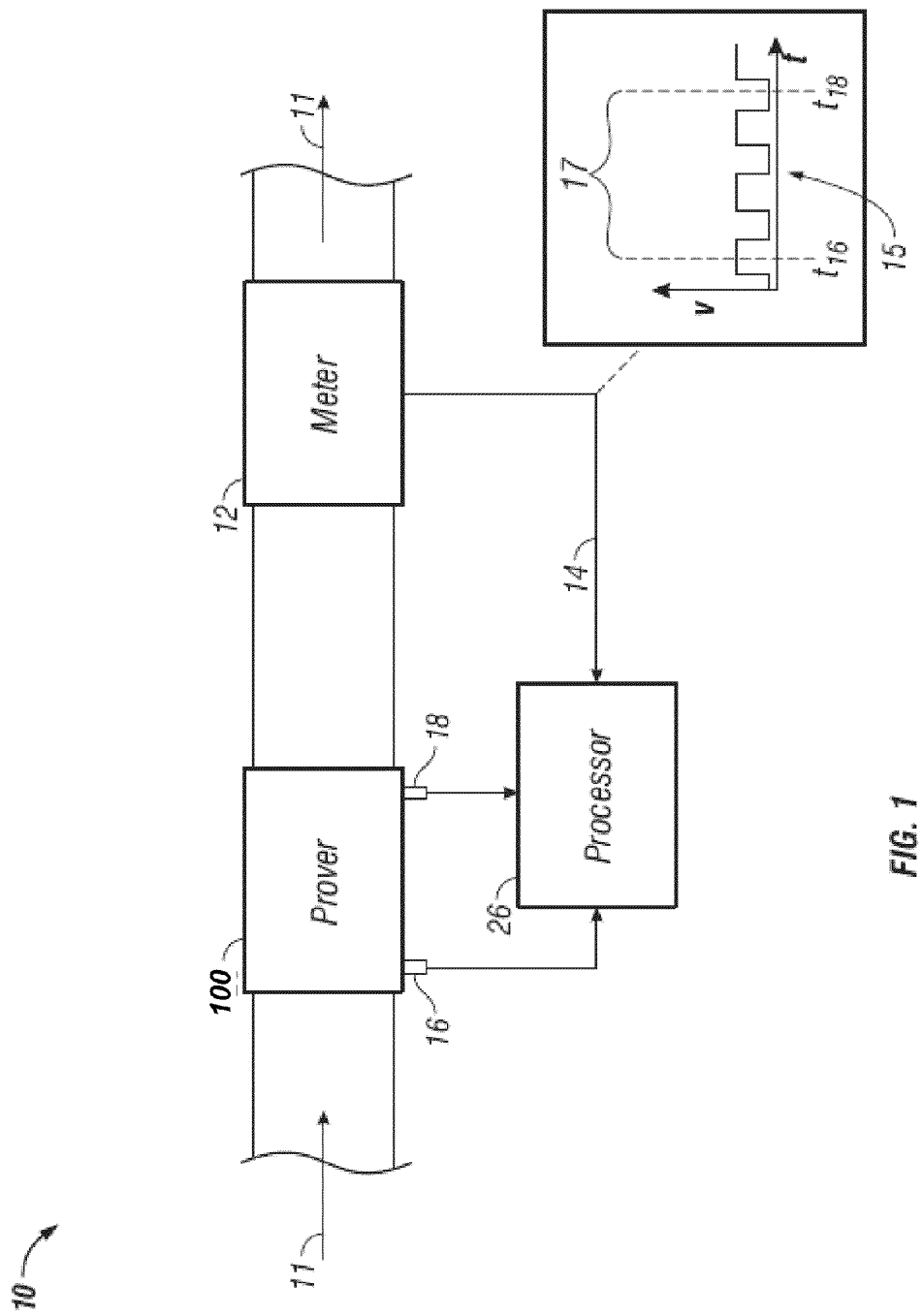
FIG. 1 is a schematic representation of a system for proving a flowmeter in accordance with various embodiments.

Certain terms are used throughout the following description and claims to refer to particular system components. As one skilled in the art will appreciate, companies may refer to a component by different names. This document does not intend to distinguish between components that differ in name but not function. Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The term "fluid" may refer to a liquid or gas and is not solely related to any particular type of fluid such as hydrocarbons. The terms "pipe", "conduit", "line," "tube," or the like refers to any fluid transmission means. The recitation "based on" is intended to mean "based at least in part on." Therefore, if X is based on Y, X may be based on Y and any number of additional factors.

DETAILED DESCRIPTION

In the drawings and description that follow, like parts are typically marked throughout the specification and drawings with the same reference numerals. The drawing figures are not necessarily to scale. Certain features of the invention may be shown exaggerated in scale or in somewhat schematic form, and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings and components of the embodiments discussed below may be employed separately or in any suitable combination to produce desired results.

Embodiments of the present disclosure can be used with a flowmeter prover for precise determination of displacer location dynamically inside the flow tube of the flowmeter prover. Embodiments are applicable to provers with either bidirectional or unidirectional fluid movement through the prover flow tube. One common term used in description of a flowmeter prover is "Displacement Prover". Embodiments are not limited to a "Displacement Prover" and may also be utilized with a "Small Volume Prover" or "Compact Prover" or any other device for which accurate determination of the dynamic position of a piston type or similar displacer is desirable. Embodiments may be applied to proving meters with pulse per unit volume output with either a conventional displacement prover for which the flowmeter generates a minimum of 10,000 pulses during proving or less than 10,000 pulses using double chronometry or pulse interpolation techniques as described in the American Petroleum Institute (API) Standards. Meters with alternate types of outputs may also be used with embodiments described herein with application of appropriate gating of the flowmeter's registration between the detectors on the flowmeter prover flow tube.

Various methods and devices have been utilized to determine position of the displacer in a flowmeter prover. These include mechanical plunger type switches, optical switches actuated by a rod extending from the displacer inside the flow tube to a location outside the flow tube, magnetic reed switches and magnetic type switches that utilize a magnetic material to displace a magnet which actuates a switch, among others. All of these are limited to ranges of temperature smaller than provided by embodiments described herein, and are therefore not useable at cryogenic or elevated temperature, and exhibit less than desired accuracy over smaller ranges of temperature and dynamic translation. Embodiments of the present disclosure employ technology by which an inductive transducer's output is enhanced by new and innovative techniques to provide precise dynamic position detection of a displacer translated across the face of the transducer (e.g., translated perpendicularly across the face). Provers in accordance with embodiments disclosed herein are operable over a range of temperatures from about −380° F. (−230° C.) up to about 800° F. (425° C.). Embodiments are compatible with API, International Standards Organization (ISO) or other standards that apply for correcting the fluid volume measured at operating temperature to "standard" or base temperature and pressure conditions used for custody transfer of fluids.

FIG. 1 is a schematic representation of a system 10 for proving a flowmeter 12 in accordance with various embodiments. In one embodiment, the flowmeter 12 is a turbine meter. Based on turning of a turbine-like structure within the fluid stream 11, the turbine flowmeter generates electrical pulses 15 where each pulse is proportional to a volume, and the rate of pulses proportional to the volumetric flow rate. In other embodiments of the system 10, the flowmeter 12 may be a positive displacement meter, an ultrasonic meter, a coriolis meter, or a vortex meter, or any time of flowmeter known in the art. The flowmeter 12 volume can be related to a prover 100 volume by flowing a displacer in the prover 100. In the system 10, the prover 100 is disposed upstream of the flowmeter 12. In other embodiments, the prover 100 may be disposed downstream from flowmeter 12. Generally, the displacer is forced first past an upstream detector 16 then past a downstream detector 18 in the prover 100.

The volume between detectors 16, 18 is a calibrated prover volume. The volume may be calibrated to a high degree of accuracy by means of the waterdraw or other method as outlined in API or other International Standards. In the waterdraw method, clean water is pumped through the prover flow tube into test measures certified by NIST or another weights and measures organization. Filling of the test measures is gated to start and stop by the action of the detectors 16, 18 as the displacer passes through the flow tube. The temperature of the water in the test measure and temperature and pressure of the water in the prover are measured and corrections are made to the displaced volume to standard temperature and pressure base conditions. In this way, the displaced volume between the detectors may be accurately established.

The flowing displacer first actuates or trips the detector 16 such that a start time $t_{16}$ (FIG. 1) is indicated to a processor or computer 26. The processor 26 then collects pulses 15 from the flowmeter 12 via signal line 14. The flowing displacer finally trips the detector 18 to indicate a stop time $t_{18}$ and thereby a series 17 of collected pulses 15 for a single pass of the displacer. The number 17 of pulses 15 generated by the flowmeter 12 during the single displacer pass through the calibrated prover volume is indicative of the volume measured by the flowmeter during the time $t_{16}$ to time $t_{18}$. By comparing the calibrated prover volume to the volume measured by the flowmeter 12, the flowmeter 12 may be corrected for volume throughput as defined by the prover 100.

Figure 2:
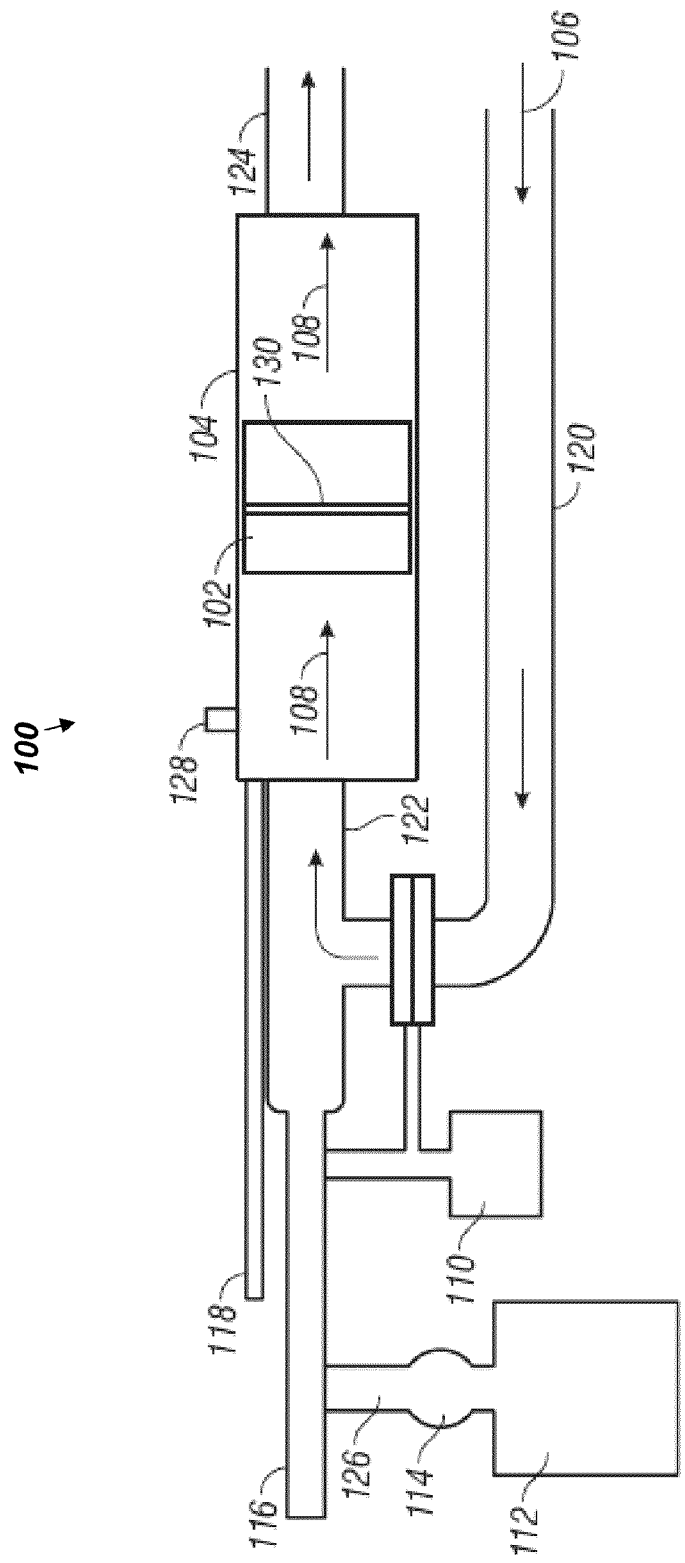
FIG. 2 is a schematic representation of a uni-directional prover in accordance with various embodiments.

In a particular embodiment of the prover 100, and with reference to FIG. 2, a piston or compact prover 100 is shown. A piston 102 (one type of displacer) is reciprocally disposed in a flow tube 104. A pipe 120 communicates a flow 106 from a primary pipeline to an inlet 122 of the flow tube 104. The flow 108 of the fluid forces the displacer 102 through the flow tube 104, and the flow eventually exits the flow tube 104 through an outlet 124. The flow tube 104 and the piston 102 may also be connected to other components, such as a spring plenum 116 that may have a biasing spring for a poppet valve in the piston 102. A chamber 118 may also be connected to the flow tube 104. A hydraulic pump and motor 110 is also shown coupled to the flow line 120 and the plenum 116. A hydraulic reservoir 112, a control valve 114 and a hydraulic pressure line 126 are also shown coupled to the plenum 116.

The prover 100 includes a target 130 that may be positioned at various locations along the axial length of the piston 102. The flow tube 104 includes one or more transducers 128, also disposable at various positions along the axial length of the flow tube 104, for detecting passage of the target 130. The target 130 is the trip instigator for entry into and exit from the calibrated measuring section of the flow tube 104 of the prover 100.

The one or more transducers 128 are inductive proximity detectors, and are mounted on the prover flow tube 104 such that there is no physical contact between the magnetic material of the displacer 102 (or magnetic material on the displacer 102) and the transducer(s) 128. Each transducer 128 may be installed on the flow tube 104 by mechanical fastening such as utilization of threads between the transducer 128 and a mounting base on the flow tube 104, bolting, bands, clamping or other physical means. The transducer 128 may be installed perpendicular to the axis of the flow tube 104 or at any other angle to the flow tube 104. The face of the transducer 128 may protrude through a hole in the flow tube 104, flush with the inside surface, recessed from the inside surface, or may be installed into a blind hole which does not intersect the inside surface of the flow tube 104. Alternatively, the face of the transducer 128 may be disposed outside the flow tube 104, either on the outside surface or the flow tube 104 or separated from the outside surface of the flow tube 104 by a non-magnetic mounting material.

A gap between the face of the transducer 128 and the magnetic material on the piston, or piston itself, is controlled by either the depth of the hole, by adjusting the insertion depth of the transducer 128 into the hole, or other mounting or positioning apparatus. The flow tube 104 may be made of either non-magnetic material or paramagnetic material. Examples of non-magnetic material are non-ferrous metals, plastics, glass, or composite materials such as glass-reinforced plastics, epoxy, or polymers. Paramagnetic materials include some types of metal alloys and different types of corrosion resistant or stainless steels heat treated to exhibit non-magnetic or paramagnetic properties. Similarly, the displacer 102 may be made from any of the above materials. The upper temperature limit of prover operation is determined by the Curie temperature of the magnetic material on the displacer. The transducer 128 is designed to output a signal or "pulse" as the magnetic material on the displacer 102, or the displacer 102 itself, if magnetic, passes across the face of the transducer 128.

Figure 3:
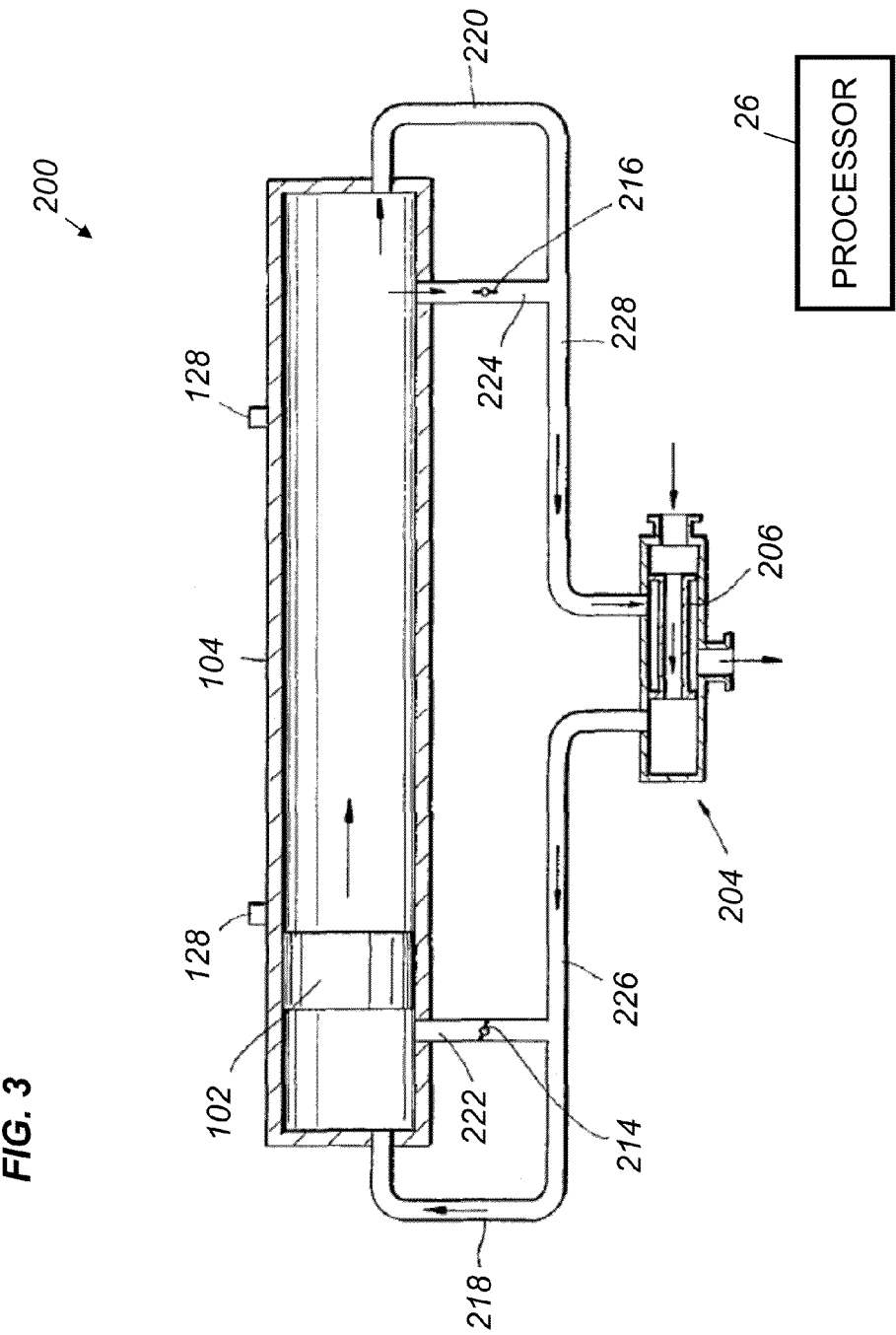
FIG. 3 is a schematic representation of a bi-directional prover in accordance with various embodiments.

FIG. 3 is a schematic representation of a bi-directional prover 200 in accordance with various embodiments. In the bi-directional prover 200, the displacer 102 cycles bank and forth within the flow tube 104 through a proving section defined by the transducers 128. The flow tube 104, the displacer 102, and the transducers 128 are arranged as described above with regard to the prover 100 with adaptation for use in the bi-directional prover 200. The transducers 128 are inductive proximity detectors and the displacer 102 includes a magnetic target. The bi-directional prover 200 includes launch valves 222, 224 and spool valve 204 that open and close under control of processor 26. The positions of the valves determine the direction of displacer 102 travel within the flow tube 104. As shown in FIG. 3, with launch valve 214 closed, launch valve 216 open, and the spool valve member 206 intersecting flow from the manifold conduit 228, the launch conduit 222 is blocked and fluid flow is routed through the bypass spool conduit 218 causing the displacer 102 to move to the right. Similarly, with launch valve 216 closed, launch valve 214 open, and the spool valve member 206 intersecting flow from the manifold conduit 226, the launch conduit 224 is blocked and fluid flow is routed through the bypass spool conduit 220 causing the displacer 102 to move to the left. Other embodiments of the bi-directional prover 200 include other types of valves and/or other arrangements of valves and fluid conduits. Embodiments of the present disclosure encompass all such variations.

Figure 4:
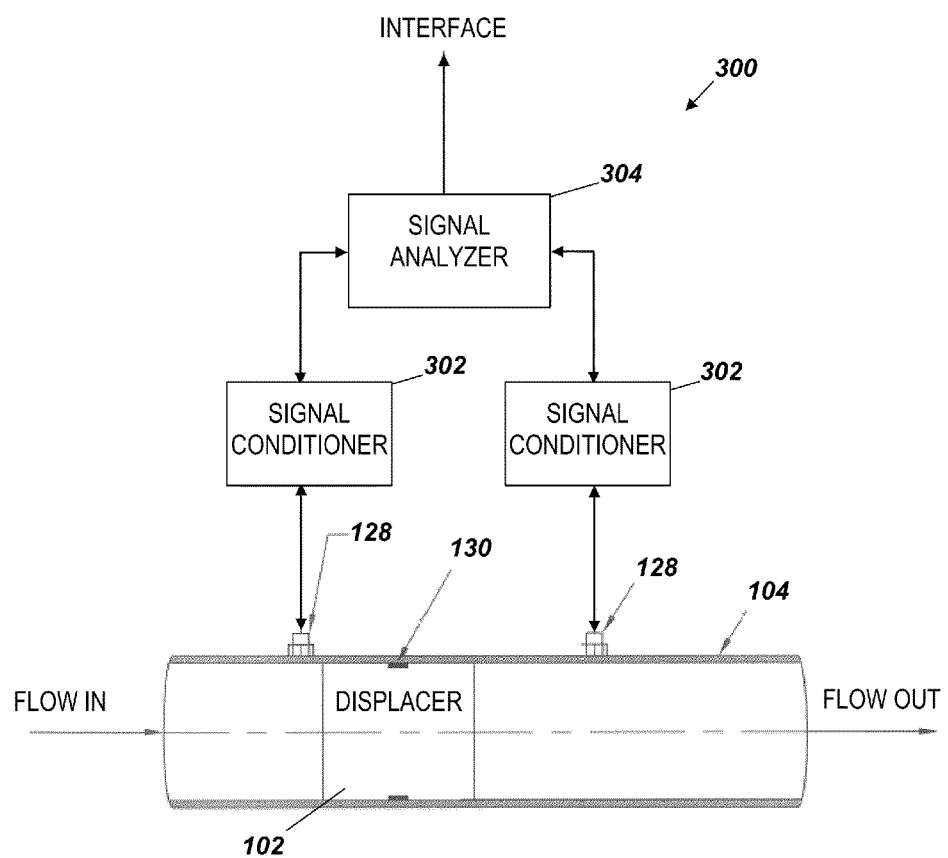
FIG. 4 is a schematic representation of a proving system including prover flow tube, displacer and proximity transducers in accordance with various embodiments.

FIG. 4 is a schematic diagram of a proving system 300 including the prover flow tube 104, displacer 102, and proximity transducers 128 located on the flow tube 104. The proving system 300 may be used to implement the provers 100, 200 shown in FIGS. 1-3. In FIG. 4, flow in one direction is illustrated as a matter of convenience, but embodiments of the proving system 300 are operable with bi-directional flow. The proving system 300 includes a signal conditioning module 302 connected to each of the transducers 128. The proximity transducer 128 includes, for example, one or more electrical wire coils (two or more coils in some embodiments) encapsulated inside a sealed housing of non-magnetic or paramagnetic material. The principle of operation of the transducer 128 is a change of inductance of the coils as the magnetic material 130 on the displacer 102 passes across the face of the transducer 128. The magnetic material 130 may be of high magnetic permeability such as HYMU 80 or any other magnetic material.

The coils are excited by an alternating current voltage of a frequency determined to provide a detectable change of inductance when the magnetic material 130 is in close proximity to the transducer coils. This principle is used in conjunction with the signal conditioning module 302 to provide an output signal, exhibiting either change in current or change in voltage, related to the change in inductance. The signal conditioning module 302 includes circuitry that generates the alternating current voltage to the coils, receives and conditions the change of inductance in the coils by detection, and amplifies and filters the coil output into an output signal related to the change in position of the magnetic material 130. The resulting output signal is related to precise linear translation of the displacer 102 past the face of the transducer 128. The output signal may be either analog or digital.

A signal analyzer 304 is shown connected to the signal conditioning modules 302. The signal analyzer 304 may be either an electronic data logging or data acquisition device, flow computer, laptop computer, portable computer, conventional computer or other electronic storage and display device which may receive and analyze the output signal provided by the signal conditioning module 302. The signal analyzer 304 may correspond to the processor 26 of FIGS. 1, 3. Previous usage of inductive transducers in proving systems was for relatively slow movement of a magnetic object in the direction directly in line axially with the transducer. Embodiments of the present disclosure advantageously allow relatively fast, dynamic movement of the magnetic material 130 across the face of the transducer 128 for a wide range of operating velocities from zero to 5 feet per second (1.5 meter per second) or higher.

Various components of the proving system 300 including at least some portions of the signal conditioning module 302 and the signal analyzer 304 can be implemented using one or more processors included in the proving system 300. The processors execute software programming that causes the processors to perform the operations described herein. In some embodiments, the signal analyzer 304 includes a processor executing software programming that causes the processor to determine displacer 102 position and/or velocity based a signal representative of change in inductance generated by the signal conditioning module 302, and/or perform other operations described herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium internal or external to the proving system 300. A computer readable storage medium comprises volatile storage such as random access memory, non-volatile storage (e.g., FLASH storage, read-only-memory, optical disk, hard drive, etc.), or combinations thereof.

Some embodiments can implement portions of the proving system 300, including portions of the signal conditioning module 302 and the signal analyzer 304, using dedicated circuitry (e.g., dedicated circuitry implemented in an integrated circuit). Some embodiments may use a combination of dedicated circuitry and a processor executing suitable software. For example, some portions of the signal analyzer 304 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 5:
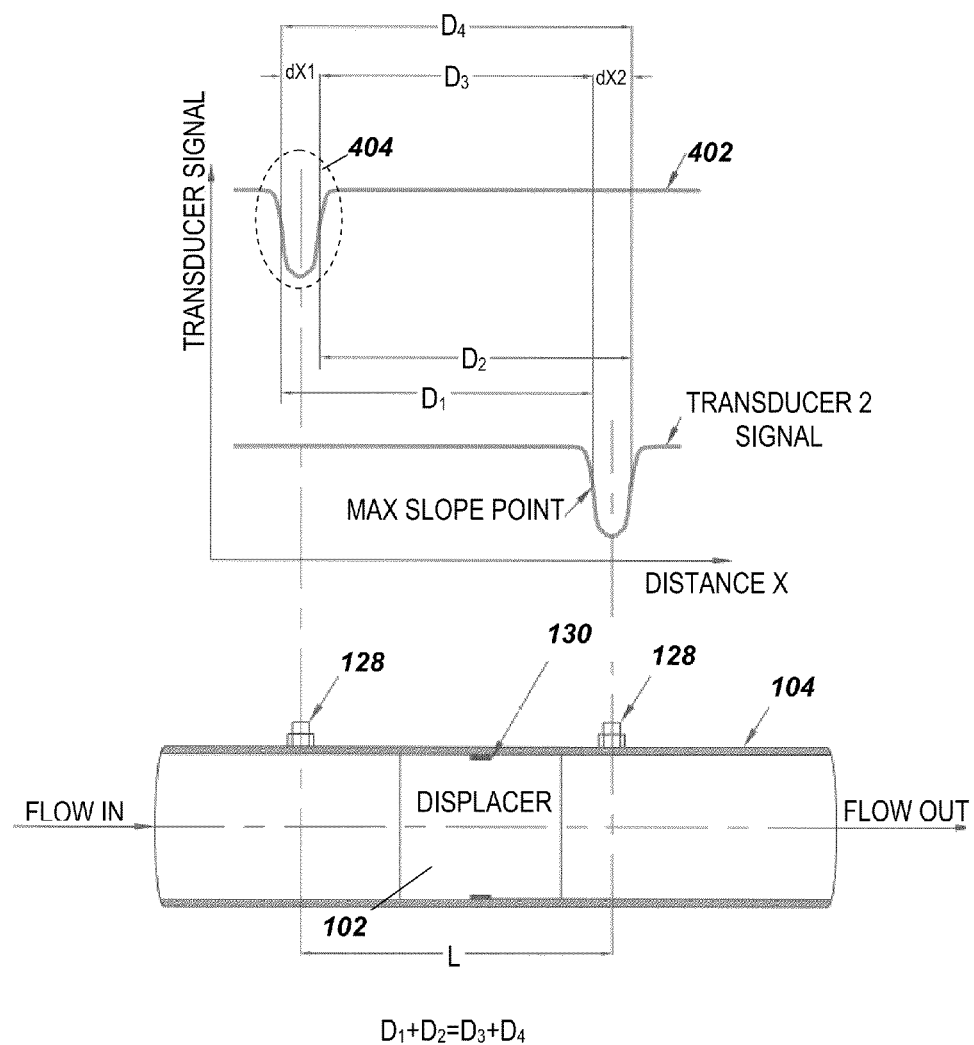
FIG. 5 is a schematic representation of a proving system showing output signals produced as the displacer passes the transducers in accordance with various embodiments.

FIG. 5 shows an electrical output signal 402 and pulse 404 provided by the signal conditioning module 302 when the magnetic material 130 on the displacer 102 passes across the face of the proximity transducer 128. The horizontal axis on the diagram is depicted for both increasing time and travel distance of the displacer 102 in order to provide a visual representation of the pulse output 404 from the signal conditioner 302 as the displacer 102 passes the transducer 128. The pulse shape may be sinusoidal, a square wave or any other desired shape. In the "quiescent" state in which the displacer 102 is either stationary or far away from a transducer 128, the output (either voltage or current) of the signal conditioning module 302 is substantially constant. The magnitude of the constant output may be adjusted internally to the signal conditioning module 302 as either "zero" or "full scale" or any interval between zero and full scale to represent the position of the displacer 102 as not in close proximity to the transducer 128.

As the displacer 102 approaches the transducer 128 such that the magnetic material 130 is close to the face of the transducer 128, the output signal 402 changes either negatively or positively, depending on zeroing and scaling of the output signal 402. The output signal 402 is at the minimum (or maximum depending on zeroing and scaling) when the magnetic material 130 is directly in line axially with the electrical inductance "center" of the transducer 128. The electrical center may be generally the same as the physical center of the transducer 128, but may vary slightly depending on construction and calibration of the transducer 128. Adjustment and calibration of the output can be done with the actual transducers 128 installed on the flow tube 104.

Embodiments of the present disclosure utilize the output of the transducer 128 in a unique and innovative fashion to detect the linear position of the displacer 102 in the prover flow tube 104. Embodiments additionally employ output of a single transducer 128 to establish two distinct and unique detection points relating to position of the displacer 102. In order to correlate the output signal 402 to a precise position of the displacer 102, the signal analyzer 304 detects or "triggers" at a point on the output pulse 404 that will provide the desired repeatability and resolution of the output in relation to the position of the displacer 102. The signal analyzer 304 may perform detection or triggering by comparing the output signal 402 to a specific predetermined magnitude value, utilizing sufficient resolution and response time to achieve the desired repeatability and resolution for displacer position determination. For example, the signal analyzer 304 may include and employ an analog voltage or current comparator that compares the output signal 402 to a trigger or detect point value, and generates a trigger indication based on the output signal 402 closely matching the trigger value. Other means, such as direct digital analysis wherein the output signal 402 is digitized and compared to a trigger value or otherwise processed may also be used to provide the desired displacer position determination. Embodiments of the signal analyzer 304 set the comparator or triggering device for optimum performance thereby providing the means to utilize the maximum sensitivity of the transducer 128 to determine linear position of the displacer 102.

As shown in FIG. 5, as the magnetic material 130 approaches the transducer 128, the slope of the pulse output 404 (volts per unit change of linear translation or dV/dX) is less steep at first, then becomes steeper at a distance before the magnetic material 130 is directly in line with the centerline of the transducer 128. When the magnetic material 130 is centered, or approximately centered, in the electrical field of the transducer 128, the pulse output 404 has approximately zero slope. If the point of minimum slope of the output signal pulse 404 is used for position detection, the resolution of displacer 102 position will be lower than if the maximum slope point of the pulse 404 is used. The voltage change at the minimum slope point of the pulse 404 may be very gradual in terms of displacement change compared to a significantly larger change of voltage per unit displacement at the maximum slope point on the pulse. Therefore, embodiments of the signal analyzer 304 use the maximum slope of the pulse 404 or maximum rate of change of output signal 402 per unit of linear translation as the detect point or trigger point to achieve the maximum resolution for detecting the position of the displacer 102.

As the velocity of the displacer 102 is increased, the pulse output 404 can exhibit a lag in response to incremental position change of the displacer 102. The shift in position detection is in the same direction and may be of the same magnitude for other transducers 128 installed and calibrated on the same flowmeter prover 300 provided that the velocity of the displacer 102 is the same at each transducer 128. However, for accurate flowmeter calibration, the flow rate should be uniform, with displacer velocity approximately constant during the time the displacer 102 travels the distance between the transducers 128 that are used to trigger the start and stop registration of the flowmeter's output.

Embodiments of the present disclosure analyze proving results to determine if the average velocity of the displacer 102 is uniform through the prover 300 and of the same magnitude as the displacer 102 passes each of the transducers 128. Accordingly, the signal analyzer 304 compares transit time between falling and rising detection points (e.g., edges of the pulse 404) for each transducer 128 independently. As the distance between the falling and rising detection points occurs over a very short distance, the transit time provides an accurate indication of the velocity of the displacer 102 as it passes a single transducer 128. The signal analyzer 304 also uses transit time between two transducers 128 for comparison of average displacer velocity among one or more sets of two transducers 128. The comparison can then be used to determine if proving results are affected by non-uniformity of the flow rate through the flowmeter prover 300 by the relationship $$V = \frac{Q}{A},$$

where:
V is the displacer velocity,
Q is the flow rate, and
A is the cross-sectional area of the flow tube 104.

The magnitude of the non-uniformity of flow relates to whether the flow rate stability is within tolerance for accurate and repeatable flowmeter proving.

Embodiments of the disclosure also employ methodology to evaluate "health" of a transducer's performance in conjunction with the transducer 128, a signal conditioning module 302, and a signal analyzer 304 (such as a computer with display or printout functionality). Embodiments establish a baseline of performance for each transducer 128 by recording a "snapshot" of signal output (e.g. signal waveform 402) versus time during initial operation of the flowmeter prover 300. Initial operation of the prover 300 may be either at the time of calibration of the prover 300 or at the time the prover 300 is commissioned for use with the fluid and the flowmeter(s) 12.

Snapshots of performance are recorded with various fluids and flow rates across the range for which the prover 300 is used. The initially recorded snapshots may be periodically compared to currently recorded snapshots obtained in actual operation to determine if the transducers 128 and related circuitry (e.g. signal conditioner 128) are still performing adequately.

Additionally, embodiments of the invention can evaluate the health of a transducer 128 by comparing the transit time between falling and rising detection points (e.g., rising and falling edges of the pulse 404) for a single transducer 128 to a history of previous transit times for the transducer 128 at the same displacer 102 velocity. For this evaluation, the flow rate should be stable as mentioned previously. This evaluation may be done at the time of waterdraw calibration of the prover, as is known in the art of calibrating flowmeter provers, and on a periodic basis thereafter.

Embodiments of the invention may also evaluate transducer health, or performance, by evaluating the four displacer detection points (e.g., rising and falling pulse edges) of the pulses provided by two transducers 128 on the prover flow tube 104.

The signal analyzer 304 can trigger on one or both of falling and rising edges of the transducer's output pulse 404. The pulse 404 results from the response of the transducer 128 to the magnetic material 130 of the displacer 102. As the leading edge of the magnetic material 130 moves into close proximity with the transducer 128, the signal 402 decreases to a minimum at the point in which the magnetic material 130 is centered, or approximately centered, electrically or magnetically, across the face of the transducer 128. As the magnetic material 130 moves away from the transducer 128, the signal 402 increases until the trailing edge of the magnetic material 130 is past the transducer 128. Conversely, the span and zero settings may be made to invert the pulse if so desired.

A detect point can be established for both falling and rising edges of output signal 402 of the same transducer 128. A single transducer 128 provides two detect points that are proportional to the physical size of the magnetic material 130. Two transducers 128 may then be used to establish four calibrated volumes on a flowmeter prover 100 by the waterdraw or similar calibration method. Additional transducers may be provided to establish additional calibrated volumes if so desired.

FIG. 5 shows an example of four volumes related to the detect points produced from the two transducers 128. The volumes and distances may be measured in accordance with established industry tolerances as known to the skilled in the art. The relationship of the linear distances is:

$$D_1 + D_2 = D_3 + D_4$$

Embodiments of the invention apply this relationship to provide yet another method for checking transducer health. The four distances $D_1$, $D_2$, $D_3$ and $D_4$ relate to the four waterdraw calibration volumes, respectively. The four meter output registrations would therefore follow the same relationship:

$$VOL_1 + VOL_2 = VOL_3 + VOL_4$$

By verifying the four metered volumes for proving a flowmeter 12, corrected to base temperature and pressure conditions as outlined in API Standards, to the above relationship, embodiments determine if the detection system is performing within the required repeatability tolerance.

During waterdraw calibration of a prover with two conventional detector switches connected in parallel, it is not uncommon for the displacer to be temporarily "lost" if a conventional detector switch does not provide an output upon passing of the displacer. Such a temporary loss of the displacer is problematic due to the low flow velocity necessary for prover calibration. If either switch fails to perform, there will be a delay in time while the displacer travels from one switch to the second switch. If neither switch performs, the displacer will appear to be lost in that its position or location is undetermined.

In embodiments of the present disclosure, the direction of travel of the displacer is well known. The direction is determined by recording or displaying the falling and rising detect points of the signal 402 in relation to a time base. The fluid flow through the flow tube 104 causes the displacer 102 to move in the direction of flow. With transducer 128 output (i.e. the signal 402) adjusted for zero and scaled as shown in FIG. 5, the falling detect point will occur before the rising detect point. Conversely, if the pulse configuration is inverted from that shown in FIG. 5, the rising detect point will occur before the falling detect point. The time sequence of the two detect points will provide an indication of the direction of the displacer 102 travel in a very short time, which is related to the relatively short travel distance of the displacer 102 in causing an output pulse (and two detect points) to be generated by a single transducer 128.

Figure 6:
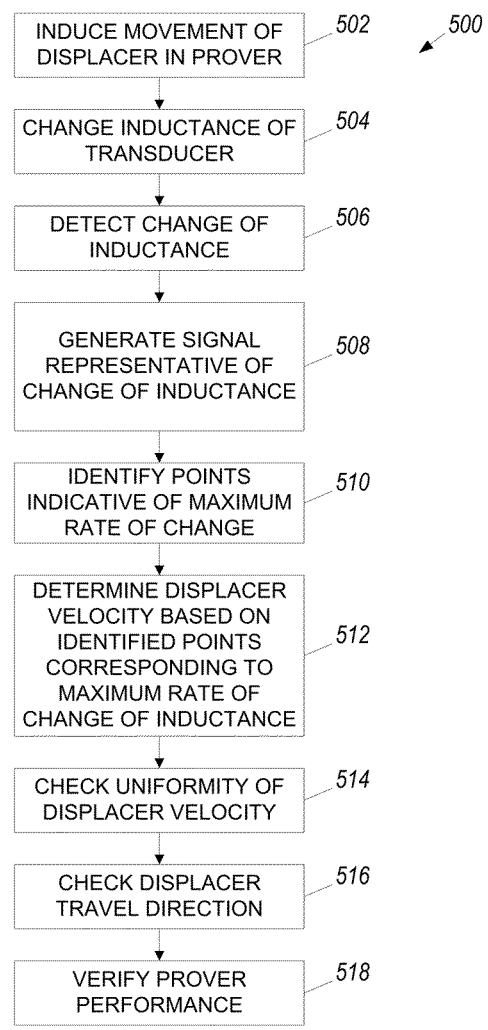
FIG. 6 shows a flow diagram for a method for proving a flowmeter in accordance with various embodiments.

FIG. 6 shows a flow diagram for a method 500 for proving a flowmeter 12 in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 6, as well as other operations described herein, can be implemented as instructions stored in a computer readable medium and executed by one or more processors.

In the method 500, the flowmeter prover 300 may be fluidically coupled to the flowmeter 12 upstream or downstream of the flowmeter 12. In block 502, flow of fluid in the flow tube 104 cause the displacer 102 to move along the length of the flow tube 104. Inductive transducers 128 are positioned along the flow tube 104. The displacer 102 includes a magnetic target 130.

In block 504, the inductance of the transducers 128 changes in accordance with the proximity of the magnetic target 130 to the transducer 128. The signal conditioning module 302 detects the change in inductance of the transducer 128 in block 506, and, in block 508, generates an output signal 402 that includes a pulse 404 or other signal representative of transducer 128 change in inductance. The slope of the pulse 404 may correspond to the rate of change of the inductance of the transducer 128.

In block 510, the signal analyzer 304 processes the signal, and identifies points indicative of maximum rate of change of transducer inductance. The points may be the points of maximum slope of each of the rising and falling edges of the pulse 404. The points of maximum slope correspond to the points of maximum rate of change in inductance of the transducer 128 as the magnetic target 130 approaches and moves past the transducer 128. In some embodiments, the points of maximum rate of inductance change may be identified based on a voltage or current level of the signal.

In block 512, the signal analyzer 304 determines the velocity and/or position of the displacer 102 based on the identified points of maximum rate of change of inductance (e.g., points of maximum slope). Displacer velocity may be determined based on the time between the identified points and the distance traveled across the transducer 128.

In block 514, the signal analyzer 304 determines the uniformity of displacer velocity in the flow tube 104 by comparing the displacer velocities computed at each transducer pulse 404 using the identified points.

In block 516, the signal analyzer 304 determines the direction the displacer based on the identified points.

In block 518, the signal analyzer 304 verifies the performance of the flowmeter prover 300. Some embodiments verify prover 300 performance by comparing the time between the identified points of maximum slope of the pulse 404 to previously recorded times between the points of maximum slope of a baseline or reference pulse for a given displacer velocity. Some embodiments verify prover 300 performance by verifying a plurality of volumes defined by a first identified point of maximum slope of a pulse 404 of one transducer 128 and a second identified point of maximum slope of a pulse 404 of another transducer 128.

The above discussion is meant to be illustrative of various principles and embodiments of the present disclosure. While certain embodiments have been shown and described, modifications thereof can be made by one skilled in the art without departing from the spirit and teachings of the disclosure. The embodiments described herein are exemplary only, and are not limiting. For example, as a matter of conciseness, embodiments have been described with reference to particular types and configurations of flowmeter provers. Those skilled in the art will understand that embodiments of the invention are not limited to those described, but are applicable to any of a wide variety of flowmeter provers. Accordingly, the scope of protection is not limited by the description set out above, but is only limited by the claims which follow, that scope including all equivalents of the subject matter of the claims.

What is claimed is:

1. A flowmeter prover, comprising:
    a flow tube;
    a displacer moveable in a flow passage of the flow tube;
    a magnetic target disposed on the displacer;
    at least two inductive transducers disposed on the flow tube, the transducers configured to detect the magnetic target as the displacer moves in the flow tube; and
    a signal analyzer configured to:
        detect a signal indicative of change of inductance of each transducer caused by the magnetic target moving across the transducer; and
        determine displacer velocity based on edges of the signal.

2. The flowmeter prover of claim 1, further comprising a signal conditioning circuit coupled to each transducer, the signal conditioning circuitry configured to generate, for each transducer, a signal comprising a pulse having a slope corresponding to the rate of change of inductance of the transducer.

3. The flowmeter prover of claim 2, wherein the signal analyzer is configured to determine a position of the displacer in the flow tube based on a point of maximum slope of the pulse.

4. The flowmeter prover of claim 2, wherein the signal analyzer is configured to identify a first detection point as a point of maximum slope of a rising edge of the pulse and a second detection point a point of maximum slope of a falling edge of the pulse.

5. The flowmeter prover of claim 4, wherein the signal analyzer is configured to determine the velocity of the displacer based on the first detection point and the second detection point.

6. The flowmeter prover of claim 4, wherein the signal analyzer is configured to determine whether the velocity of the displacer is uniform over the length of the flow tube based on determined velocity of the displacer as the displacer moves across each transducer.

7. The flowmeter prover of claim 4, wherein the signal analyzer is configured to verify performance of the flowmeter prover by comparing the time between the first detection point and the second detection point to previously recorded times between the first detection point and the second detection point at a given displacer velocity.

8. The flowmeter prover of claim 4, wherein the signal analyzer is configured to verify performance of the flowmeter prover by verifying a plurality of volumes defined by one of the first and second detection points of one of the transducers and one of the first and second detection points of one of another of the transducers.

9. The flowmeter prover of claim 4, wherein the signal analyzer is configured to determine a travel direction of the displacer in the flow tube based on the first detection point and the second detection point.

10. The flowmeter prover of claim 2, wherein the signal analyzer is configured to verify performance of the flowmeter prover by comparing the signal generated by the signal conditioning circuit for each transducer at a given flow rate to stored baseline signals for each transducer at the given flow rate.

11. The flowmeter prover of claim 1, wherein the flow tube and the displacer comprise at least one of a non-magnetic material and a paramagnetic material.

12. The flowmeter prover of claim 1, wherein the transducer and signal analyzer are configured to measure displacer velocity of a bidirectional fluid flow at a fluid temperature of −380 degrees Fahrenheit to 800 degrees Fahrenheit.

13. The flowmeter prover of claim 1, wherein the signal analyzer configured to:
    detect a rate of change of inductance of each transducer caused by the magnetic target moving across the transducer; and
    determine displacer velocity based on a maximum of the detected rate of change of inductance.

14. A method for proving a flowmeter, comprising:
inducing movement of a displacer in a flow tube of a prover by fluid flow;
changing inductance of an inductive transducer coupled to the flow tube based on proximity of a magnet target of the displacer to the transducer;
detecting a signal indicative of change of the inductance; and
determining displacer velocity based on edges of the signal.

15. The method of claim 14, further comprising generating a signal based on the output of the transducer, the signal comprising a pulse having a slope corresponding to the rate of change of inductance of the inductive transducer.

16. The method of claim 15, further comprising verifying performance of the prover by comparing the signal generated based on the output of the transducer at a given flow rate to stored baseline signals for the transducer at the given flow rate.

17. The method of claim 15, further comprising determining a position of the displacer in the flow tube based on a point of maximum slope of the pulse.

18. The method of claim 17, further comprising:
identifying a first detection point as a point of maximum slope of a rising edge of the pulse; and
identifying a second detection point a point of maximum slope of a falling edge of the pulse.

19. The method of claim 18, wherein determining displacer velocity comprises determining the time interval defined by the first and second detection points and the distance traveled by the displacer in the time interval.

20. The method of claim 18, further comprising determining whether the velocity of the displacer is uniform over the length of the flow tube based on a comparison of displacer velocity at each of a plurality of inductive transducers, the velocity derived from the first and second detection points associated with the transducer.

21. The method of claim 18, further comprising verifying performance of the prover by comparing the time between the first detection point and the second detection point to previously recorded times between the first detection point and the second detection point at a given displacer velocity.

22. The method of claim 18, further comprising verifying performance of the prover by verifying a plurality of volumes defined by one of the first and second detection points of one of a plurality of inductive transducers and one of the first and second detection points of one of another of the plurality of transducers.

23. The method of claim 18, further comprising determining a travel direction of the displacer in the flow tube based on the first detection point and the second detection point.

24. The method of claim 14, wherein detecting the signal comprises detecting a rate of change of the inductance; and determining displacer velocity comprises determining displacer velocity based on a maximum of the detected rate of change of the inductance.

25. A flow metering system, comprising:
a flowmeter prover, comprising:
a displacer disposed in a flow tube, the flow tube comprising:
a plurality of inductive transducers disposed along the length of the flow tube;
a pulse generation circuit coupled to each transducer, the pulse generation circuit configured to generate a pulse having slope corresponding to a rate of change of inductance of the transducer produced by the displacer moving across the transducer.

26. The flow metering system of claim 25, further comprising a flowmeter coupled to the flowmeter prover.

27. The flow metering system of claim 25, wherein the flowmeter prover further comprises a signal analyzer coupled to the pulse generation circuit, the signal analyzer configured to:
determine a position of the displacer in the flow tube based on a point of maximum slope of the pulse;
identify a first detection point as a point of maximum slope of a rising edge of the pulse and a second detection point a point of maximum slope of a falling edge of the pulse;
determine the velocity of the displacer based on the first detection point and the second detection point;
determine whether the velocity of the displacer is uniform over the length of the flow tube based on determined velocity of the displacer as the displacer moves across each transducer; and
determine a travel direction of the displacer in the flow tube based on the first detection point and the second detection point.

28. The flow metering system of claim 25, wherein the signal analyzer is further configured to verify performance of the flowmeter prover by at least one of:
comparison of the time between the first detection point and the second detection point to previously recorded times between the first detection point and the second detection point at a given displacer velocity;
verification of a plurality of volumes defined by one of the first and second detection points of one of the transducers and one of the first and second detection points of one of another of the transducers; and
comparison of the signal generated by the signal conditioning circuit for each transducer at a given flow rate to stored baseline signals for each transducer at the given flow rate.

* * * * *